(12) United States Patent
Abate et al.

(10) Patent No.: US 7,244,325 B2
(45) Date of Patent: Jul. 17, 2007

(54) METHOD OF MANUFACTURING AN INSULATED GLASS UNIT

(75) Inventors: Kenneth Abate, Beaver Falls, PA (US); Craig Duncan, Hudson, FL (US)

(73) Assignee: Film Technologies International, Inc., St. Petersburg, FL (US)

(*) Notice: Subject to any disclaimer, the term of this patent is extended or adjusted under 35 U.S.C. 154(b) by 484 days.

(21) Appl. No.: 10/793,958

(22) Filed: Mar. 5, 2004

(65) Prior Publication Data

US 2005/0194086 A1  Sep. 8, 2005

(51) Int. Cl.
*C03C 27/00* (2006.01)
*E06B 3/24* (2006.01)

(52) U.S. Cl. .................. 156/109; 156/101; 156/107; 428/34; 52/786.11; 52/786.13

(58) Field of Classification Search ............... 156/99, 156/101, 104, 106, 107, 108, 109; 428/34, 428/38, 430; 52/786.11, 786.13
See application file for complete search history.

(56) References Cited

U.S. PATENT DOCUMENTS

| | | | |
|---|---|---|---|
| 3,537,944 A | 11/1970 | Grubb et al. | |
| 3,869,198 A | 3/1975 | Ballentine | |
| 4,799,745 A | 1/1989 | Meyer et al. | |
| 4,963,206 A | 10/1990 | Shacklette et al. | |
| 4,997,687 A | 3/1991 | Carter | |
| 5,030,503 A | 7/1991 | Carter et al. | |
| 5,037,475 A | 8/1991 | Chida et al. | |
| 5,071,206 A | 12/1991 | Hood et al. | |
| 5,156,894 A | 10/1992 | Hood et al. | |
| 5,234,711 A | 8/1993 | Kamen et al. | |
| 5,320,893 A * | 6/1994 | Floyd | 428/136 |
| 5,332,888 A | 7/1994 | Tausch et al. | |
| 5,468,532 A | 11/1995 | Ho et al. | |
| 5,494,715 A * | 2/1996 | Glover | 428/34 |
| 5,585,427 A | 12/1996 | Schimmel et al. | |
| 5,631,089 A * | 5/1997 | Center et al. | 428/437 |
| 5,645,940 A * | 7/1997 | Teddington et al. | 428/430 |
| 5,750,265 A | 5/1998 | Goodman | |
| 5,897,957 A | 4/1999 | Goodman | |
| 5,950,398 A * | 9/1999 | Hubbard | 52/786.1 |
| 6,030,671 A | 2/2000 | Yang et al. | |
| 6,218,018 B1 | 4/2001 | McKown et al. | |
| 6,294,233 B1 | 9/2001 | Barth et al. | |
| 6,333,084 B1 | 12/2001 | Woodard et al. | |
| 6,365,284 B1 * | 4/2002 | Liposcak | 428/621 |
| 6,391,400 B1 | 5/2002 | Russell et al. | |
| 6,546,692 B1 | 4/2003 | Duncan et al. | |
| 6,558,800 B1 | 5/2003 | Stachowiak | |
| 6,632,491 B1 | 10/2003 | Thomsen et al. | |

\* cited by examiner

*Primary Examiner*—John L. Goff
(74) *Attorney, Agent, or Firm*—Christopher Paradies; Fowler White Boggs Banker P.A.

(57) ABSTRACT

A metallized coating is applied to a first surface of a multi-layered window film, the coating applied by vacuum deposition to form a laminated film composite. A second surface of the multi-layered window film composite is adhesively attached to a first glass pane. A thin outer edge strip of the outermost layer of the film coated with the metallized layer is removed. A second glass pane is prepared in the same way. The two glass panes are adapted to be mounted in a frame with the first surface of the film coated with the metallized coating facing each other spaced apart with a spacer. A sealant fills a cavity between the two glass panes to form an insulated glass unit.

24 Claims, 4 Drawing Sheets

METHOD OF MANUFACTURING AN INSULATED GLASS UNIT

BACKGROUND OF THE INVENTION

This invention relates to methods of manufacturing insulated glass units (IGUs). More particularly, it refers to methods of forming sealed IGUs by adhesively coating a pair of glass substrates with a thin multi-layered film, the film's outer layer having a metallized coating applied by vacuum deposition or sputter-deposition.

It is known that energy is controlled at a window by the reflection, transmission and absorption of solar radiation by the glazing type and emissivity of the glazing. An IGU contributes to the heat gain or loss of the window by three mechanisms: conduction of heat, convection whereby air currents within the IGU act as the transfer agent for heat, and radiation or reradiation of the heat absorbed. When solar radiation strikes an IGU energy is absorbed and either conducted or reradiated. The ability to reradiate is called emissivity. When a spectrally selective, vacuum deposited, metal or metallic coating is incorporated into the surface within an IGU, it assists with energy release by absorbing the IR portion of the solar spectrum and reradiating the absorbed energy to the surrounding atmosphere in the direction of the surface of the coating and the atmosphere interface. If the spectrally selective coating is encapsulated within a film or system and the coating itself is not exposed to the environment, the majority of the ability to reradiate energy is lost as conduction becomes the major pathway for the absorbed energy. It is important for a spectrally selective coating to be exposed to an atmosphere in order to reduce the energy transfer by reradiation of the absorbed energy. Standard laminated glass where two pieces of glass are adhered together by a plastic do not incorporate spectrally selective, vacuum deposited, metal or metallic coatings within the laminate for this reason.

The ability to incorporate a spectrally selective, vacuum deposited, metal or metallic coating within an IGU utilizing a film composite having an emitting coating on the inner surface or surfaces of the IGU provides enhanced absorbed heat dissipation capability as it takes advantage of the filtering out of IR light, absorbs most of the UV portion of the spectrum, allows for neutral colored visible light to be transmitted, and takes advantage of the emissivity of the coating to reradiate absorbed light. This provides for a better insulation value for the IGU portion of the window and enhanced safety performance because of the film laminate adhered to the inner surface of the glass.

It is known that the reactivity of spectrally selective coatings consisting of multi-layers of vacuum deposited or sputter-deposited metals or metallic compounds can corrode depending on the chemical composition when exposed to moisture or other chemicals. When this happens the corrosion products are aesthetically displeasing and the solar radiation controlling performance of the coatings is lost. A manufacturing method is needed to avoid this corrosion problem.

SUMMARY OF THE INVENTION

The manufacturing process of this invention protects the spectrally selective coating immediately after manufacturing the multi-layered film composite. This invention provides a temporary protective film which can be removed without harming the spectrally selective metallic film and allows handling, shipping and processing without damaging the spectrally selective coating. The protective film is removed just before IGU manufacture which then incorporates these spectrally selective coatings within the cavity of an IGU, thus exposing them to a benign environment substantially free from moisture. These measures ensure the integrity of the spectrally selective coating and the long term performance of the IGU as a superior insulator. This invention allows for the use of spectrally selective, vacuum deposited or sputter-deposited, metal or metallic coatings on one surface of a multi-ply plastic film composite in an IGU without corroding the metallic coating and taking advantage of the emissivity of said coating.

A pair of glass substrates adapted for insertion into a frame unit are each adhesively bonded to a laminated film composite. Each film composite is formed by applying a metallized coating by vacuum deposition or sputter-deposition on an outer layer of a thin multi-film base. A protective film is temporarily applied over the metallized layer until the film is adhesively bonded to the glass pane. The protective film is then removed and an outer edge strip of the outer layer of the multi-film layer is stripped away. The glass pane surfaces are mounted in the frame with the two metallized layers facing each other. A spacer keeps the glass panes apart and sealant is placed in the cavity formed by the space between the glass panes to form a sealed IGU.

BRIEF DESCRIPTION OF THE DRAWINGS

The invention is best understood by those having ordinary skill in the art by reference to the following detailed description when considered in conjunction with the accompanying drawings in which.

DETAILED DESCRIPTION OF THE BEST MODE

Figure 1:
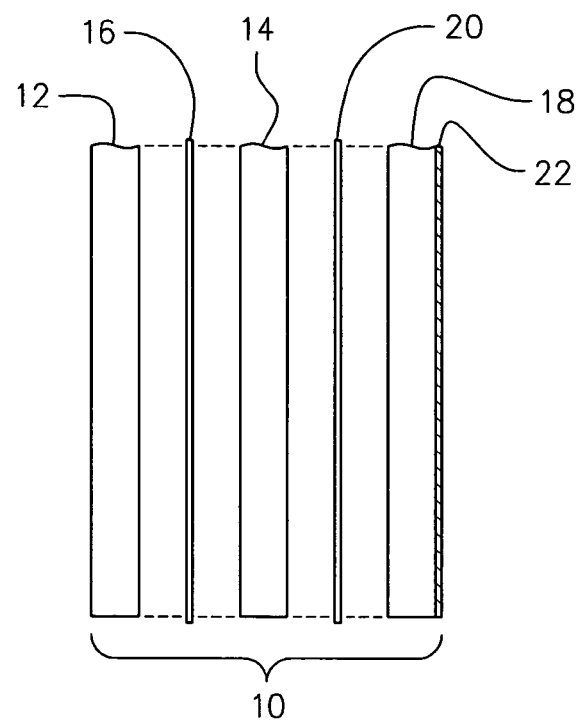
FIG. 1 is an exploded cross sectional view of a film composite of this invention containing a metallized layer.

Throughout the following detailed description, the same reference numerals refer to the same elements in all figures.

Figure 2:
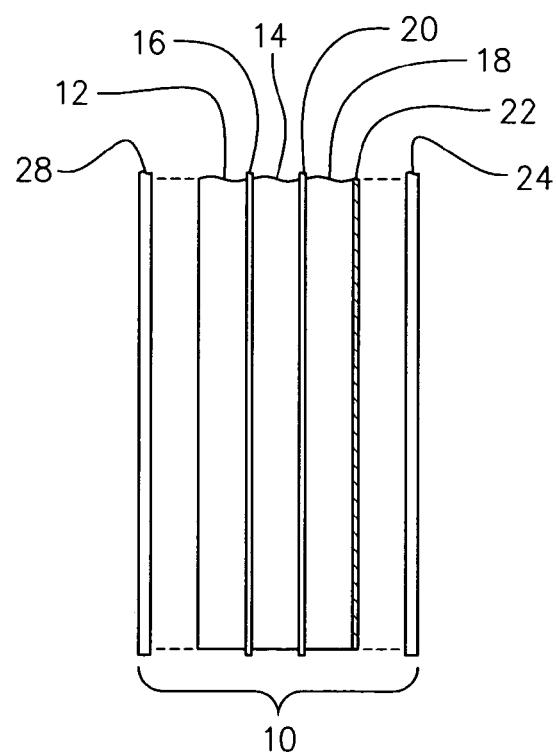
FIG. 2 is an exploded cross sectional view of the film composite of FIG. 1 with a protective film over the metallized layer.

Referring to FIGS. 1 and 2, a film composite 10 is formed by laminating several layers of polyethyleneterephthalate (PET) films together. PET film layers 12 and 14 are held together by acrylic pressure sensitive adhesive 16 and PET film layer 18 is bonded to PET film layer 14 by acrylic pressure sensitive adhesive 20. PET layer 18 incorporates a spectrally selective vacuum deposited metallic coating 22 and protective coating 24 is applied to the outer side of PET layer 18 to protect coating 22. In alternative examples, the method applies the metallized coating to the outer layer of film 18 either before or after the outer layer of film 18 is adhesively bonded with an adjacent layer of a multi-layered film composite film.

Figure 3:
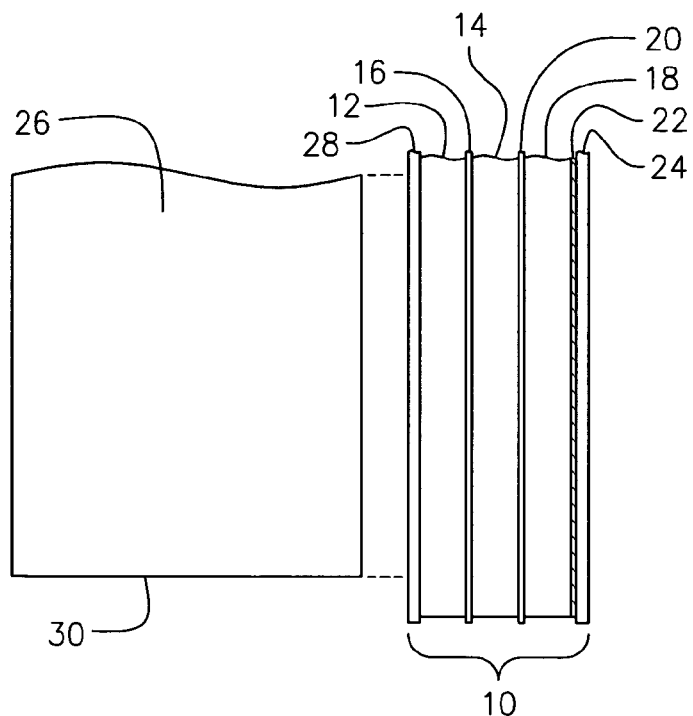
FIG. 3 is a cross sectional view of the film composite of FIG. 2 about to be bonded to a glass pane.
Figure 4:
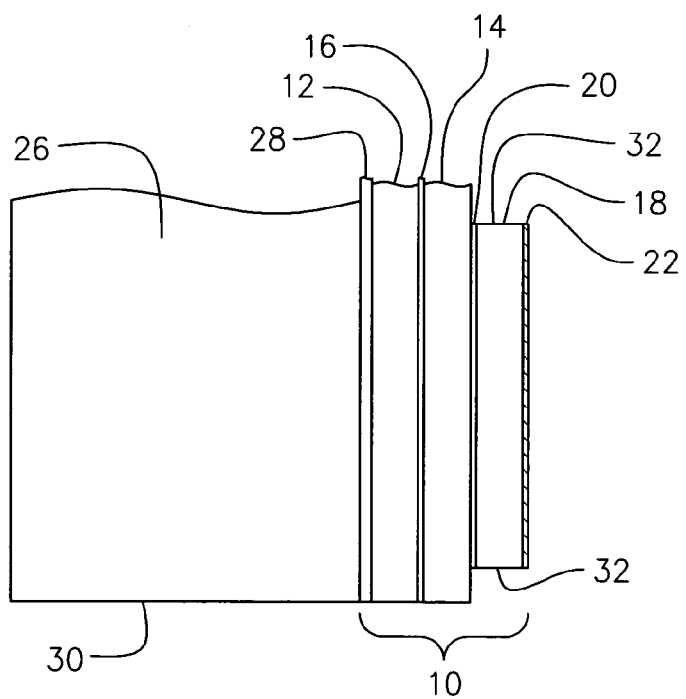
FIG. 4 is a cross sectional view of the outer film metallized layer edge stripped away.

The individual plies of PET 14 and 16 do not have to be of the same thickness and are held together with the acrylic pressure sensitive adhesive 20. The different layers of PET film 12 and 14 can equal or vary significantly in thickness depending on desired properties, i.e., 2 mils laminated with 4 mils, or 4 mils laminated to 4 mils, or 1 mil laminated to 10 mils, etc. It is typical for the spectrally controlling PET film 18 to be based on a 1 to 3 mil PET film, but can be thicker. The resulting film composite 10 is classified as a safety film and is used to coat a window pane 26 as shown in FIGS. 3 and 4 by attachment with acrylic adhesive 28. This composite film thickness can vary from 4 mils to 30 mils total depending on the end use desired and the choice of individual PET film thickness. Other safety film can be used and the individual ply thickness can vary as can the number of plies used to manufacture the film composite. These films can be made of polycarbonate, polyester, or other like polymeric materials. It is important that during the manufacturing of the composite 10 that a protective, temporary, masking film 24 is applied to protect the spectrally selective film 18 from the environment and contamination. The laminated film composite 10 is laminated to one surface of the glass pane 26 with adhesive 28.

Just prior to manufacturing the IGU, the protective coating 24 is removed from the glass/laminated film composite surfaces as seen in FIG. 4. With care, and using the edge 30 of the glass 26, a cut 32 through the outermost layer 18 of the film composite 10 parallel with the edge 30 of the glass 26 is made on all sides of the glass/film composite laminate. Care is taken to only cut through the outer film 18 and to not disturb the other plies of PET film. The cut 32 is typically from 3/16" to 1/2" from the edge 30 of the glass 26. The thin strip, bordered by the edge 30 of the glass, formed from the cut 32 is then removed leaving a picture frame appearance, FIG. 4, to the glass pane.

Figure 6:
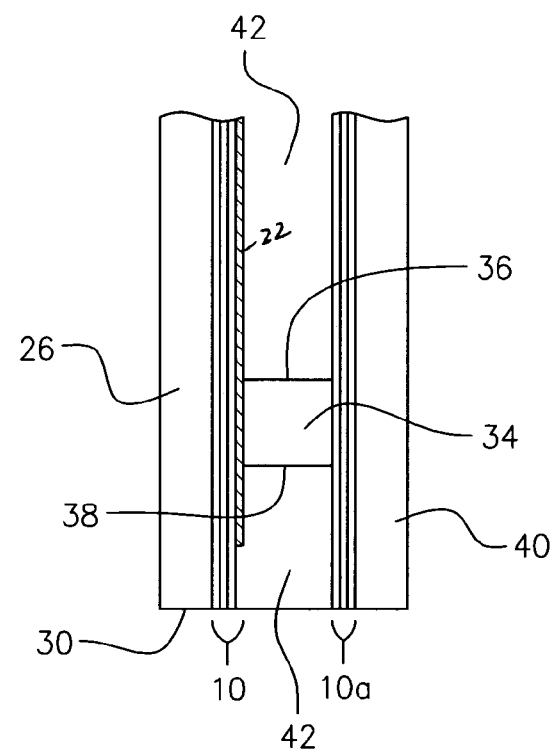
FIG. 6 is a cross sectional view of two glass panes adapted for mounting in a frame with a spacer in between a film composite metallized layer and a non-metallized layer.

A glass pane/laminated film composite 10a shown in FIG. 6, can be similarly made using only PET films and not incorporating a spectrally controlled film. This too is classified as a safety film and is described in U.S. Pat. No. 6,546,692, incorporated herein by reference.

If desired, for aesthetics or performance, layers of colored film can be used with the film composites 10 and 10a. The color will influence the overall transmitted light but will not adversely influence the emissivity of the exposed spectrally selective coating.

Figure 5:
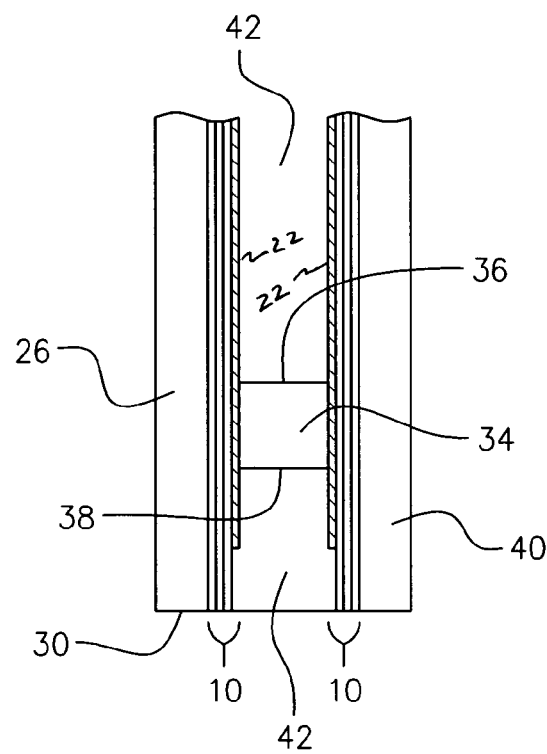
FIG. 5 is a cross sectional view of two glass panes adapted for mounting in a frame with a spacer in between two film composite metallized layers.
Figure 7:
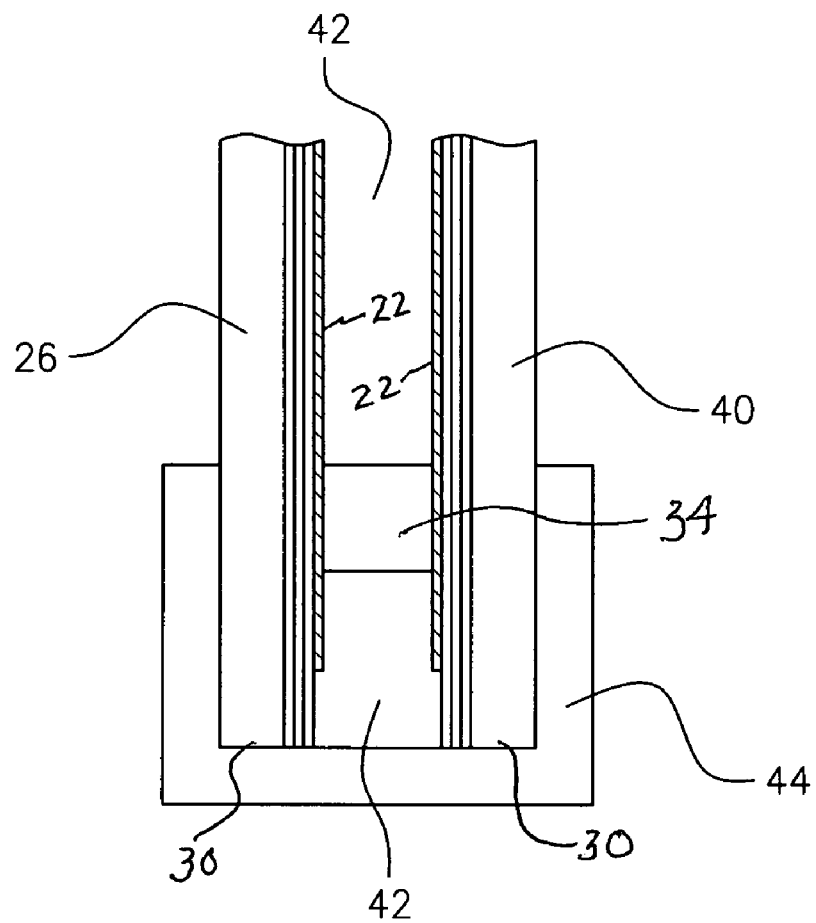
FIG. 7 is a cross sectional view of the two glass panes of FIG. 5 mounted in a frame.

Two of the laminated window panes shown in FIG. 5 are faced to each other with the spectrally selective coatings 22 facing inward and a spacer 34 shown in FIGS. 5 and 6 having a top inboard surface 36 and a bottom outboard surface 38 is placed between the laminated surfaces of the two panes 26 and 40 and pressed together to form a multiple window pane composite or IGU shown in FIGS. 5 and 6. A structural silicone or butyl or like IGU glazing sealant 42 is backfilled from the outboard surface 38 of the spacer 34 to the edge 30 of the laminated window pane window as seated in a frame 44 as seen in FIG. 7. The IGU is preferably positioned on a setting block when installed in frame 44. The panes also can be used in a door system.

As an alternate IGU composition, one can laminate to one of the panes 40 in the above IGU a glass/film composite 10a whereby there is no spectrally controlling layer in the film composite. When this glass/film composite 10a is substituted in the pane 40 utilizing a spectrally controlling film layer 22 is not a needed. Then there is no need to remove a portion of the film composite as there is not spectrally selective coating to corrode. The film composite 10 or 10a can cover the total pane. The resulting IGU made with using one pane 26 with a spectrally controlling layer and one pane 40 without a spectrally controlling layer is shown in FIG. 6.

In addition to dual paned IGUs, this invention can be employed for multi-paned IGU's where enhanced security, insulation value, and sound attenuation is desired. An example is a triple paned IGU, i.e., having three glass panes incorporated into the IGU, or greater depending on applicability. The outer two glass panes are as described previously. The additional panes can be glass, polymeric, or combinations of these with or without adhered films.

The spacer 34 employed should have a thickness sufficient so its outboard surface 38 extends about 1/4" to 5/8" from the window pane edge 30 and its inboard surface is on the "site line" of the window frame of the window in which it is placed. The width of the spacer 34 between the laminated window panes should be about 1/4" to 9/16" but may be smaller or larger in order to allow for an overall thickness appropriate for the window in which it is being glazed.

Typically, a desiccant agent is incorporated with the spacer system in order to initially scavenge residual moisture within the IGU cavity and throughout the service life of the IGU.

Inert gas or mixtures may be used to replace the air within the IGU cavity and these techniques are well known within the industry. The inert gas or mixtures aid with the insulating performance of the IGU by mitigating the convection pathway for heat transfer, especially when incorporating a spectrally selective coating on the inside of the IGU cavity to emit absorbed energy.

The dimension by which the framing system overlaps the edge of the glazing infill or IGU should be between 1/2" to 1 inch with 5/8" to 7/8" being preferred.

The minimum glass pane 26 or 40 thickness will vary depending on the area of use, wind load chart and building codes. About 3/8" glass is suitable in most areas with a laminated film inner surface thickness of 0.0008 to 0.02 inch.

Having described the invention what is claimed for Letters Patent follows:

1. A method of manufacturing an insulating glass unit, the steps comprising:
  applying a metallized coating to an outer surface of a first polymer film by vacuum deposition or sputter-deposition, the first polymer film being an outer layer of a first and second multilayered film composite comprised of a plurality of layers, an inner surface end an outer surface opposite of the inner surface;
  adhesively applying a removable masking film over the metallized coating to temporarily protect the metallized coating;
  laminating the inner surface of the first and second multilayered film composite, to a first surface of a first glass pane and a first surface of a second glass pane, respectively;
  removing the masking film from the metallized coating on the first glass pane and the second glass pane;
  removing an outer edge strip of the outer layer of the multilayered film composite such that the outer layer and the metallized coating are removed along the outer edge strip without removing other layers of the multi-layered film composite on the first glass pane and the second glass pane;

mounting the first glass pane and the second glass pane such that the first surface of the first glass pane and the first surface of the second glass pane are spaced apart and face each other;

mounting a spacer between the first glass pane and the second glass pane; and filling a cavity between the first glass plane and the second glass pane with a sealant to form an insulating glass unit.

2. The method according to claim 1, wherein the metallized coating is applied by vacuum deposition.

3. The method according to claim 1, wherein the metallized coating is applied by sputter-deposition.

4. The method according to claim 1, wherein the multilayered film composite is comprised of a plurality of layers of film comprised of a polyethyleneterephthalate.

5. The method according to claim 4, wherein the step of laminating includes selecting a thickness of each of the plurality of layers of film to be in the range of 1 to 4 mils.

6. The method according to claim 4, wherein an acrylic adhesive is applied between each of the plurality of layers of film.

7. The method according to claim 1, wherein the step of mounting the spacer includes selecting the spacer between the first and second glass pane to have a thickness in a range of about ¼ to 9/16 inch.

8. The method according to claim 1, wherein the step of removing the outer edge strip removes a strip having a width in a range of 3/16 to ½ inch.

9. The method according to claim 1, wherein the step of mounting includes bonding a multilayered film composite to a third glass pane and inserting the third glass pane between the first glass pane and the second glass pane.

10. The method according to claim 1, wherein the insulating glass unit is mounted in a window frame.

11. A method of manufacturing an insulating glass unit, the steps comprising:

adhesively bonding a plurality of layers of film together;

applying a metallized coating to a surface of an outer layer of the plurality of layers of film by vacuum deposition or sputter-deposition;

forming a laminated film composite such that the metallized coating is exposed on the surface of the outer layer of the plurality of layers of film, using the steps of applying a metallized coating and adhesively bonding;

adhesively applying a removable masking film over the metallized coating to protect the metallized coating;

laminating a second side surface of the laminate film composite to a surface of a first glass pane;

removing the masking film from the metallized coating;

removing an outer edge strip of the outer layer of the laminated film composite after the step of laminating a second side surface of the laminated film composite;

laminating a multilayered film to a second glass pane;

mounting the first and second glass pane such that the metallized coating of the first glass pane faces inwardly towards the multilayered film on the second glass pane;

mounting a spacer between the first and second glass pane; and filling a cavity between the first and second glass pane with a sealant to form an insulating glass unit.

12. The method to claim 11, wherein the insulating glass unit is mounted in a window frame.

13. The method according to claim 12, wherein the sealant is filled between the spacer and the frame at a level with an edge of the glass panes.

14. The method according to claim 11, wherein the multilayered film employed is polyethyleneterephthalate.

15. The method according to claim 11, wherein the metallized coating is applied by vacuum deposition.

16. The method according to claim 11, wherein the step of forming applies the metallized coating to the outer layer of the plurality of layers of film prior to the step of adhesively bonding.

17. A method of manufacturing an insulating glass unit, the steps comprising:

adhesively bonding a plurality of layers of a laminated film composite together;

applying a metallized coating to a first surface of an outer layer of the laminated film composite by vacuum deposition or sputter-deposition;

forming a first and second metallized film composite using the steps of applying a metallized coating and adhesively bonding;

adhesively applying a removable masking film over the metallized coating to protect the metallized coating;

laminating a second surface of the first and second metallized film composite, opposite of the first surface to a surface of each of at least two glass panes, respectively;

mounting the first and second glass panes such at the metallized coating of each of the at least two glass panes face each other; and mounting a spacer between the at least two glass panes and filling a cavity between the first and second glass pane with a sealant to form an insulating glass unit; and prior to the steps of mounting the first and second glass panes and mounting the spacer, removing the masking film from the metallized coating; and removing an outer edge strip of the outer layer including the metallized coating without removing other layers of the metallized film composite, the outer edge strip having a width selected such that the metallized coating is protected from corrosion.

18. The method according to claim 17, wherein the step of forming first applies the metallized coating to the outer layer of the laminated film composite prior to the step of adhesively bonding.

19. The method according to claim 17, wherein the insulating glass unit is mounted in a window frame.

20. The method according to claim 19, wherein the sealant is filled between the spacer and the frame at a level with an edge of the at least two glass panes.

21. The method according to claim 17, wherein the plurality of layers are comprised of a polyethyleneterephthalate.

22. The method according to claim 17, wherein the step of adhesively bonding includes selecting each of the plurality of layers to have a thickness such that the resulting laminated film composite has a thickness in a range of about 4 to 30 mils.

23. The method according top claim 17, wherein the at least two glass panes includes a third glass pane, and the third glass pane is spaced between two of the at least two glass panes.

24. The method according to claim 17, wherein at least one non-metallized glass pane is spaced between the at least two glass panes.

* * * * *